(12) United States Patent
Desai

(10) Patent No.: US 8,621,031 B2
(45) Date of Patent: Dec. 31, 2013

(54) METHOD AND APPARATUS USING CONNECTION POOLS IN COMMUNICATION NETWORKS

(75) Inventor: Arun K. Desai, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 2725 days.

(21) Appl. No.: 10/426,824

(22) Filed: Apr. 29, 2003

(65) Prior Publication Data

US 2004/0221031 A1    Nov. 4, 2004

(51) Int. Cl.
*G06F 15/16*    (2006.01)

(52) U.S. Cl.
USPC ......................................................... 709/217

(58) Field of Classification Search
USPC .................................. 709/203, 217
See application file for complete search history.

(56) References Cited

U.S. PATENT DOCUMENTS

| | | | | |
|---|---|---|---|---|
| 5,553,239 | A * | 9/1996 | Heath et al. ........................ | 726/2 |
| 5,889,957 | A * | 3/1999 | Ratner et al. .................. | 709/227 |
| 5,928,323 | A * | 7/1999 | Gosling et al. ................ | 709/203 |
| 6,105,067 | A * | 8/2000 | Batra ............................. | 709/227 |
| 6,138,120 | A | 10/2000 | Gongwer et al. | |
| 6,138,143 | A * | 10/2000 | Gigliotti et al. ............... | 709/203 |
| 6,338,089 | B1 * | 1/2002 | Quinlan ......................... | 709/227 |
| 6,393,466 | B1 * | 5/2002 | Hickman et al. ............... | 709/214 |
| 6,529,909 | B1 * | 3/2003 | Bowman-Amuah ............ | 707/10 |
| 6,604,046 | B1 * | 8/2003 | Van Watermulen et al. .. | 701/208 |
| 6,615,265 | B1 * | 9/2003 | Leymann et al. ............. | 709/227 |
| 6,631,417 | B1 * | 10/2003 | Balabine ....................... | 709/229 |
| 6,633,914 | B1 * | 10/2003 | Bayeh et al. .................. | 709/227 |
| 6,832,238 | B1 * | 12/2004 | Sharma et al. ................ | 709/201 |
| 7,120,631 | B1 * | 10/2006 | Vahalia et al. .................... | 707/8 |
| 7,216,160 | B2 * | 5/2007 | Chintalapati et al. ......... | 709/224 |
| 7,219,346 | B2 * | 5/2007 | Patiejunas .................... | 718/102 |
| 7,243,138 | B1 * | 7/2007 | Majkut et al. ................. | 709/219 |
| 2002/0147652 | A1 | 10/2002 | Gheith et al. | |
| 2004/0015566 | A1 * | 1/2004 | Anderson et al. ............. | 709/219 |
| 2004/0081137 | A1 * | 4/2004 | Hassan-Ali et al. .......... | 370/352 |
| 2004/0088413 | A1 * | 5/2004 | Bhogi et al. .................. | 709/226 |
| 2007/0088826 | A1 * | 4/2007 | Raphel et al. ................. | 709/225 |
| 2008/0155688 | A1 | 6/2008 | Casazza | |
| 2010/0318570 | A1 | 12/2010 | Narasinghanallur et al. | |

OTHER PUBLICATIONS

Oracle Call Interface Programmer's Guide, Release 2 (9.2), Chapter 9, (p. 1-56), Oracle Corporation, May 2002.

* cited by examiner

*Primary Examiner* — Asghar Bilgrami
(74) *Attorney, Agent, or Firm* — Hickman Palermo Truong Becker Bingham Wong LLP

(57) ABSTRACT

An apparatus and method are provided of communicating between an application and a server including, on a client side, establishing a connection pool to the server. In an embodiment, a communication request from a client-side entity is served by a connection that was established in the connection pool prior to the issuance of the request. Subsequent communication requests may reuse the connection that serviced the first request.

45 Claims, 10 Drawing Sheets

METHOD AND APPARATUS USING CONNECTION POOLS IN COMMUNICATION NETWORKS

FIELD OF INVENTION

The invention generally relates to communication networks, and, more specifically, relates to methods and apparatuses for communicating with servers.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art, merely by inclusion in this section.

In a client-server software system, a client-side entity, such as a process or a thread, requests services from a server. Each time a client-side entity requests communication with a server, such as a database server, a new connection is established between the server and the client-side entity. The connection that is established is dedicated to the client-side entity, and cannot be used by other client-side entities. When a client-side entity finishes communicating with the server, the connection may have to be destroyed. Additionally, in some networks, a connection may be established between a client application and a database server for use during the entire course of a user session. The connection is reserved for the client application. In this case, each time there is a new user, a new, dedicated connection to the server must be established.

In the context of networks that involve database queries, each time a request is made to communicate with the database server, a network may employ a process similar to, for example, the following process: (1) Receive a request from a client-side entity to communicate with a database; (2) Establish a dedicated connection between the client-side entity and the database; (3) Issue a query to the database; (4) Receive the results of the query; (6) Process the results of the query; and (7) Destroy the connection.

The establishment of connections each time a request is made to communicate with a server may have a negative effect on the efficiency of a network. For example, users who are attempting to communicate with a server may experience frustrating delays as dedicated connections are established each time the user attempts to communicate with the server. The delays are a result of the fact that a number of painstaking steps, such as those listed above, must be undertaken each time a connection is established. Such networks often result in the creation of an abundance of connections that are needed for only a relatively short period of time. Accordingly, such network architectures may be required to destroy a great number of connections that are no longer needed. Valuable processing resources may be consumed if connections must be frequently established and/or destroyed. For example, connection attributes may need to be respecified and reprocessed each time a connection is established.

Network architectures that establish dedicated connections for each request to communicate with a server, or for each session, may also be wasteful of network resources, because, due to their "dedicated" nature, only a single client-side entity, such as a single thread, or a particular session, may make use of a connection. In such architectures, if multiple client-side entities are attempting to communicate to the server, then there must be a separate, dedicated connection for each client-side entity. If there are many users or client-side entities, then a very large number of separate, dedicated connections may have to be established. This may result in a strain on various aspects of the network. For example, the large number of connections may consume large amounts of memory, which may hinder the performance of the network. Furthermore, wasteful overhead may result if an excessive number of idle connections for idle users who infrequently access the server, or who no longer need to access the server.

Additionally, there may exist certain applications that, based on their own particular attributes, are unable to hold a dedicated connection for each communication request. An example of such an application may be an email server. It would be desirable to have a scheme according to which such applications may efficiently connect to a server.

It would also be desirable to have mechanism whereby the foregoing processing and storage overhead problems might be avoided.

BRIEF DESCRIPTION OF THE FIGURES

The disclosed subject matter is depicted by way of representative examples, and not by way of limitation, in the illustrations of the accompanying figures. The figures include.

DETAILED DESCRIPTION

Overview

An apparatus and method are disclosed for communicating between a client-side entity, such as a process or thread, and a server, in a manner that avoids the overhead associated with starting and terminating dedicated connections every time a new connection request is received. According to one aspect, a connection pool to the server is established on the client-side of the client-server architecture.

In an embodiment, the connection pool is established the first time that a client-side entity requests communication with the database. After the connection pool is established, subsequent communication requests can be serviced by the previously established connections in the connection pool.

In an embodiment, a connection pool may be configured so that any one of the physical connections forming the connection pool can be reused by subsequent communication requests issued by any one of multiple client-side entities. Additionally, any one of the physical connections in the connection pool can be reused to service subsequent communication requests from the same single client side entity.

Techniques for using a connection pool to facilitate communication to a server are described are greater detail hereafter. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Exemplary System

Figure 1:
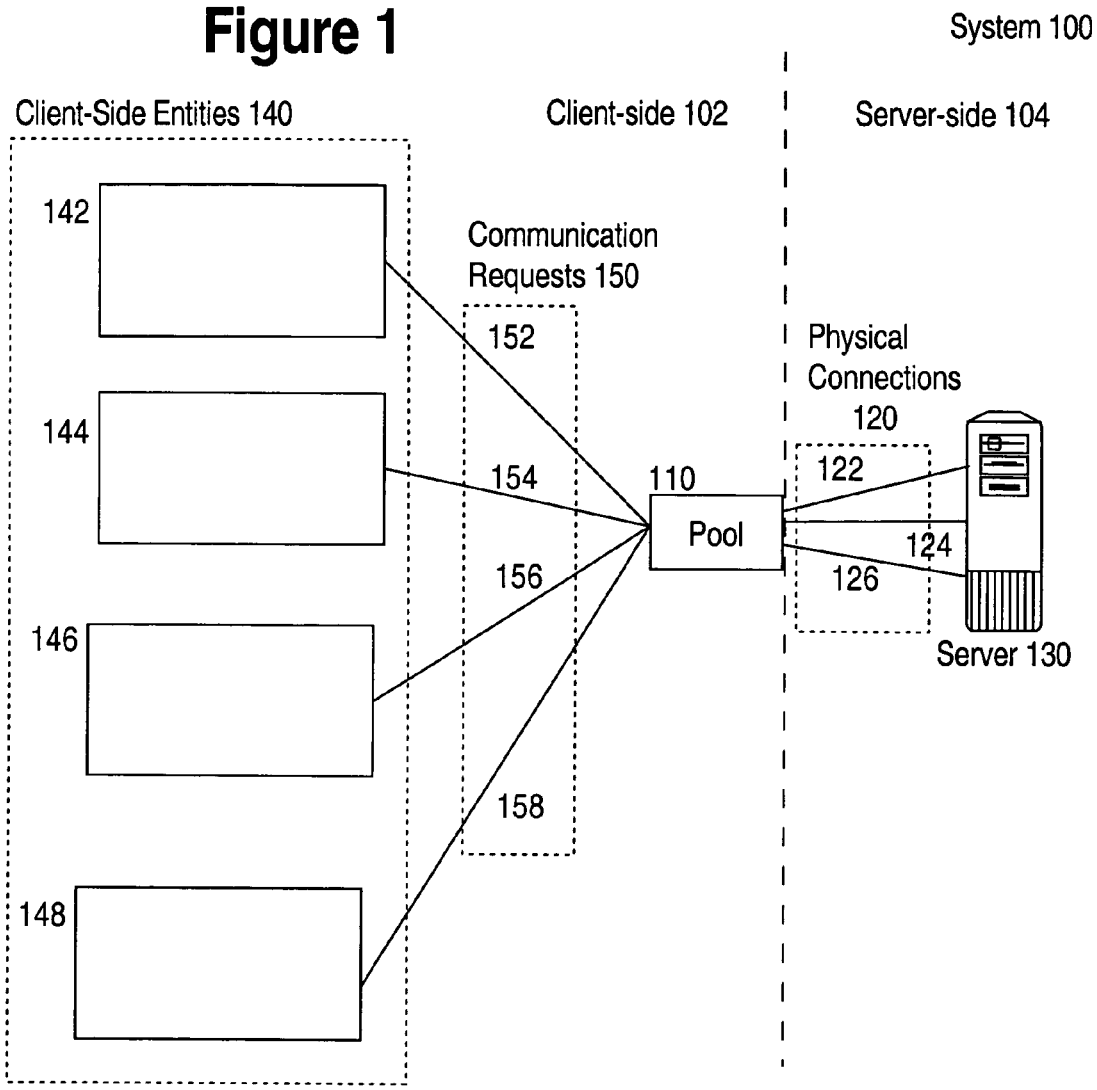
FIG. 1 is an illustration of a block diagram of an embodiment of a system comprising a connection pool to service communication requests from separate client-side entities.

FIG. 1 is an illustration of system 100, which includes at least one connection pool 110. Connection pool 110 facilitates communication requests 150 which are issued by client-side entities 140 to request communication with server 130.

In an embodiment, the first time a communication request 150 for access to server 130 is issued by a client-side entity 140, connection pool 110 is established. When initially established, connection pool 110 may include a number of physical connections 120 to server 130. In the embodiment illustrated in FIG. 1, physical connections 120 includes first physical connection 122, second physical connection 124 and third physical connection 126.

Those skilled in the art will recognize that, depending on the specific embodiment, the quantity of physical connections 120 may vary, and, could include any number of connections, including one or zero connections. The quantity of physical connections 120 that are created for a connection pool in response to initial creation of the connection pool may be adjusted as is suitable for the characteristics of system 100 or as is suitable for individual elements of system 100 or combinations thereof. The number of physical connections 120 may also be adjusted as is suitable for various attributes of the applications or users that use system 100, and/or as is suitable in respect of the data used by such applications.

The initial communication request 150 may be serviced by any of the physical connections 120 in the connection pool. Subsequent communication requests 150 may be serviced by pre-existing, "free" physical connections 120 in the connection pool 110. A physical connection is considered "free" when it is not currently assigned to, or being used by, a client-side entity. Because the connections in connection pool 110 can be reused, as long as there are free physical connections 120 in the connection pool 110, there will be no need to establish a new physical connection 120 to server 130.

If a communication request 150 is issued by a client-side entity 140, but none of the physical connections 120 in connection pool 110 are free, then at least one more physical connection 120 may be added to connection pool 110 to service the communication request 150 or subsequent communication requests 150. However, if a predetermined or dynamically determined maximum of physical connections 120 in a particular connection pool 110 have already been created, then no physical connections 120 will be added to connection pool 110, and the communication request will either be denied, or will be serviced when one of the physical connections 120 becomes free.

If it is determined that excess physical connections 120 are in connection pool 110, then at least one physical connection 120 may be removed from connection pool 110. However, if a predetermined or dynamically determined minimum amount of physical connections in a connection pool 110 has been met, then no physical connections 120 will be removed from connection pool 110.

Accordingly, in an embodiment, system 100 includes (1) means to add physical connections to, or remove physical connections from, connection pool 110; (2) means for assigning physical connections 120 to particular client-side entities and/or communication requests 150; and (3) means to monitor the status of physical connections 120 and/or communication requests 150. As shall be described in greater detail hereafter, such means may be, for example, logic of routines contained in a runtime library that is linked to the code of a client-side entity.

Server 130 may be used for various applications and various types of servers. For the purpose of illustration, embodiments shall be described in which server 130 is a database server. However, the techniques described herein may be applied in any client-server environment where client-side entities require connections to a server.

The illustrated system 100 also includes client-side entities 140. Client-side entities 140 may be, for example, various types of devices, processes or other elements, or combinations thereof. For example, client-side entity 142 could be a single thread. Or, client-side entity 142 could be a session, such as a session associated with a particular user.

As stated above, connection pool 110 may facilitate communication between server 130 and a number of client-side entities 140. In this regard, in an embodiment, in response to communication requests 150 that are issued by client-side entities 140, any free physical connection 120 in connection pool 110 may be used to service a particular communication request 150. In an embodiment, a physical connection 120 may be considered "free" if the connection satisfies one or more criteria. For example, a physical connection 120 may be considered to be free if it is not being used to service a communication request 150. In such embodiments, connection pool 110 may also include means to determine whether such a criterion is satisfied. For example, connection pool 110 may include means for determining whether a particular physical connection 120 is in use. In an embodiment, a particular physical connection 120 is considered to be free if physical connection 120 has been idle for a duration of time that is equal to, or greater than, a time out parameter.

In some embodiments, as mentioned above, connection pool 110 may include means for assigning particular physical connections 120 to a particular client-side entity 140 and/or to a particular communication requests 150. In an embodiment, if a physical connection 120 has been assigned to a particular client-side entity 140 and/or to a particular communication request 150, but a criterion is met, such as a connection timeout parameter being met, then the physical connection 120 may be reassigned to a different client-side entity 140 to service a different communication request 150. The physical connection 120 could also be reassigned to service a second communication request 150 from the same client-side entity 140.

The specific embodiment shown in FIG. 1, which includes three physical connections 120 and four client-side entities 140, will now be discussed. FIG. 1 shows an embodiment wherein system 100 includes four client-side entities 140, which are specifically denoted as client-side entity 142, client-side entity 144, client-side entity 146, and client-side entity 148.

Connection pool 110 is established the first time a communication request 150 is received from a client-side entity 140, and includes first physical connection 122, second physical connection 124 and third physical connection 126. In this example, communication request 152, which is issued by client-side entity 142, is the first communication request 150. A precompiler runtime library will create a connection pool 110 in respect to database server 130 when client-side entity 140 connects for the first time (e.g., communication request 152). When the same client-side entity 140 comes back again and asks for another connection (e.g., communication request 154), the precompiler runtime library will create an association between connection pool 110 and communication request 154, so that it can make use of any free physical connections 120 in the connection pool 110.

In this example, any free physical connection 120 may be used to service communication request 152. Because communication request 152 is the first communication request 150 that is issued by client-side entities 140, at the time request 152 is received, all physical connections 120 in connection pool 110 are free. For the purpose of explanation, it shall be assumed that first physical connection 122 is used to service communication request 152.

As discussed above, subsequent communication requests 150 may be serviced by the pre-existing, free physical connections 120 of connection pool 110. Thus, when there are free physical connections 120 in connection pool 110, additional physical connections 120 will not need to be established. For example, communication request 154, which is issued by client-side entity 144, may be serviced by any free physical connection 120. In this example, second physical connection 124, which is free, may be used to service communication request 154. Assuming that first physical connection 122 and second physical connection 124 continue to be used by, respectively, client-side entity 142 and client-side entity 144, communication request 156, which is issued by client-entity 146 may be serviced by third physical connection 126, which is free. Thus, communication request 154 and communication request 156 may be serviced without incurring the overhead of establishing a new physical connection 120.

Connection Reuse

According to one aspect, in addition to pre-allocating physical connections 120, system 100 also reuses previously assigned physical connections 120. As described in the example above, all physical connections 120 in connection pool 110 have been used to service particular communication requests 150. At this point, if another communication request 150 is received, then it still may not be necessary to establish a new physical connection 120. Specifically, if one of the physical connections 120 that was being used by a client-side entity 140 meets a criteria, such as, in an embodiment, becoming free, then the free physical connection 120 may be reused to service a subsequent communication request 150, such as communication request 158, which is issued by client-side entity 148. For example, after first physical connection 122 has finished servicing communication request 152, it may be reused to service communication request 158. Accordingly, in such circumstances, a new physical connection 120 does not need to be established, and, as such, the disclosed subject matter reduces the overhead involved in facilitating communication requests 150.

However, if first physical connection 122 is still being used to service communication request 152, and there are no free physical connections 120 in connection pool 110, then at least one new physical connection 120 may be added to connection pool 110 to service communication request 158, and/or other subsequent communication requests 150. Physical connections 120 may only be added to connection pool 110 to the extent that the total physical connection 120 in connection pool 110 does not exceed a predetermined or dynamically determined maximum number of physical connections 120 for the particular connection pool 110. If the maximum number of physical connections 120 for the particular connection pool 110 has been met, then no physical connections 120 will be added to connection pool 110, and, communication request 158 will only be serviced when a physical connection 120 in connection pool 110 becomes free. Connection pool 110 may also include means for freeing up a physical connection 120 that is in use so that the physical connection 120 may be used to service a new communication request 150.

As described above, a particular physical connection 120 may be assigned to a particular client-side entity 140 and/or to a particular communication request 150. After a communication request 150 has been completed, the physical connection 120 that was assigned to the client-side entity 140 that issued the communication request 150 may be unassigned from the particular physical connection 120, and, as an unassigned, free member of connection pool 110, the physical connection 120 may be reassigned to a different client-side entity 140 and/or communication request 150 issued by the different client-side entity 140, or the physical connection 120 may be reassigned to a second communication request 150 issued by the same client-side entity 140.

For example, in FIG. 1, after communication request 152 from client-side entity 142 has been serviced by first physical connection 122, or if a criteria such as timeout parameter is met, then first physical connection 122 may be unassigned from a client-side entity 142, and first physical connection 122 may be reassigned to client-side entity 148 to service communication request 158.

In other embodiments, first physical connection 122 is not unassigned from client-side entity 142 before it is reassigned to client-side entity 148. For example, if certain criteria are met, such as first physical connection 122 (1) has been assigned to client-side entity 142 and (2) has been used for a duration of time that exceeds a predetermined duration, then first physical connection 122 could be reassigned to client-side entity 148, without connection pool 110 performing any functions to unassign first physical connection 122 from client-side entity 142 prior to reassignment to client-side entity 148. Under these circumstances, even if first physical connection 122 is being used to service communication request 152, first physical connection 122 could be made to cease servicing communication request 152 and could be used to service communication request 158.

Additionally, connection pool 110 may include means to suspend the servicing of communication request 152 to service communication request 158. After communication request 158 has been serviced, connection pool 110 can continue to service communication request 152.

Figure 2:
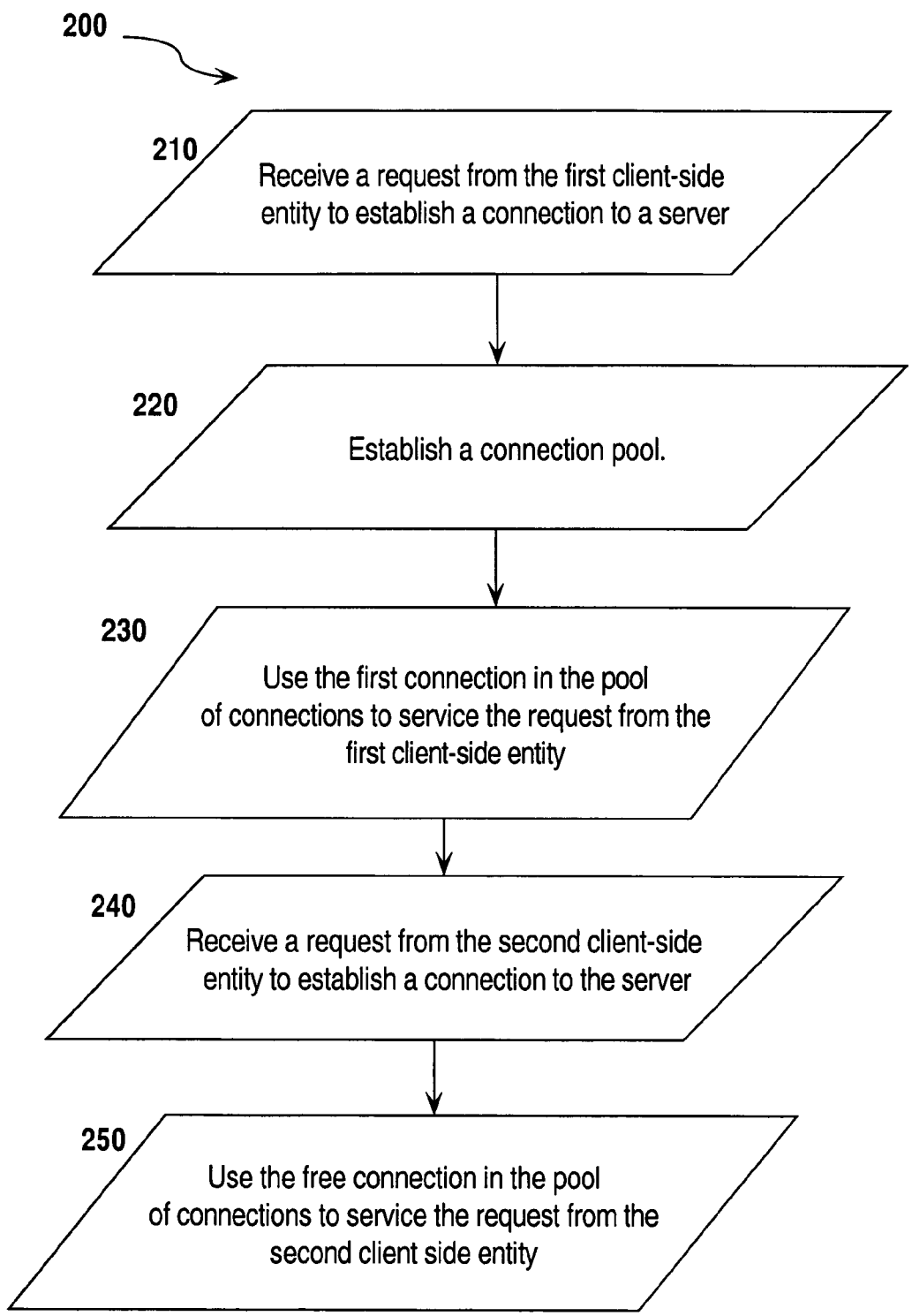
FIG. 2 is an illustration of a flowchart of an embodiment of a method of using a connection pool to service requests from separate client-side entities.

FIG. 2 is an illustration of an embodiment of method 200 for communicating with server 130, by using a connection pool 110 to service communication requests 150 from client-side entities 140. Step 210 includes establishing at least one connection pool 110. At step 210, communication request 152, which is issued by client side entity 142 to request communication with server 130, is received. Step 220 includes establishing at least one connection pool 110. Step 230 includes using first physical connection 122 in connection pool 110 to service communication request 152. In some embodiments, first physical connection 122 is assigned to client-side entity 142 and/or communication request 152.

Step 240 includes receiving communication request 158 from a client-side entity 148 to establish a connection to server 130. Step 250 includes reusing first physical connection 122 to service communication request 158. In some embodiments, one or more of the following additional steps may be included in method 200. Examples of such steps include: (1) assigning first physical connection 122 to client-side entity 142 and/or to communication request 152; (2) unassigning first physical connection 122 from client-side entity 142 and/or from communication request 152; (3) reassigning first physical connection 122 to client-side entity 148 and/or to communication request 158; (4) determining whether one or more physical connections 120 meet specified criteria, such as being free; (5) determining whether one or more physical connections 120 and/or communication requests 150 are idle or have been used or serviced for a time exceeding a timeout parameter; and/or (6) directing a physical connection 120 to cease servicing a communication request 150.

Figure 3:
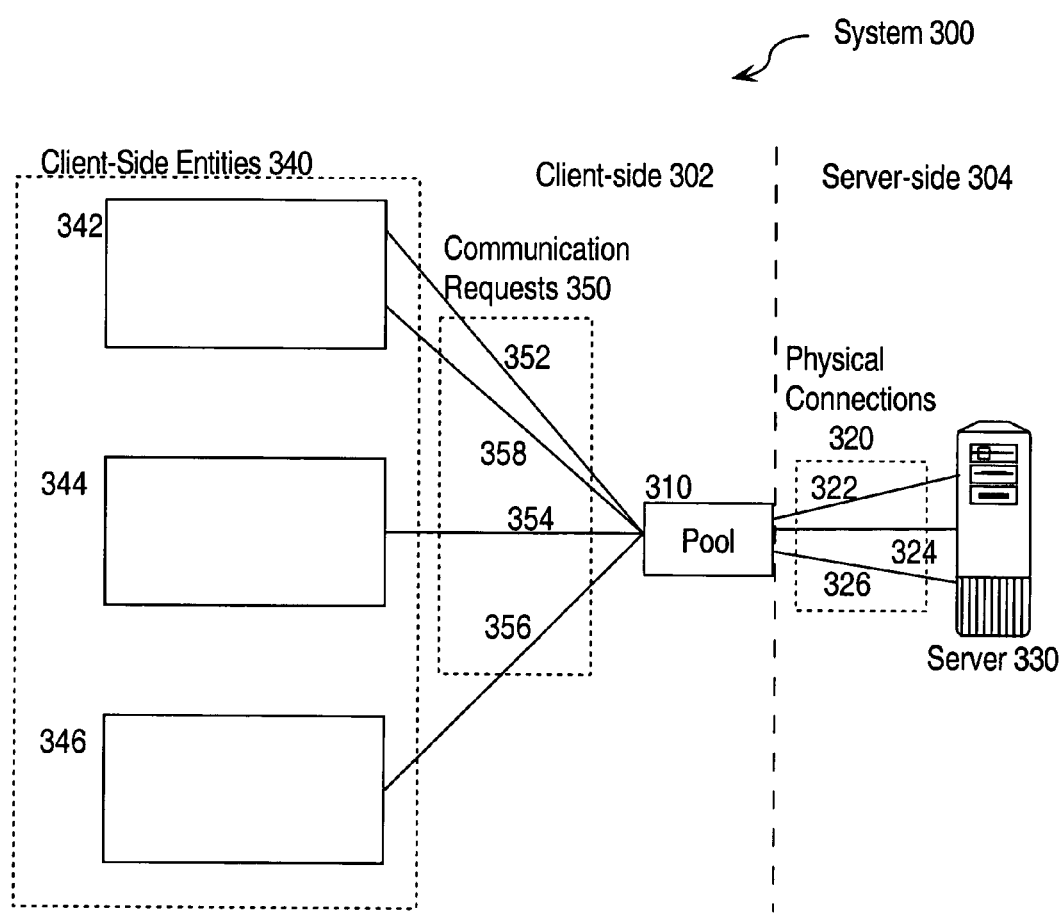
FIG. 3 is an illustration of a block diagram of an embodiment of a network comprising a connection pool to service multiple requests from a single client-side entity.

FIG. 3 is an illustration of an embodiment of system 300 including connection pool 310 to service multiple communications requests, such as first communication request 352 and second communication request 358, from a single client-side entity 342. In this embodiment, a single physical connection 320 in connection pool 310 may be reused to service multiple communication requests from the same client-side entity 340. The embodiment may reuse a single physical connection 320 in the connection pool 310 to service communications requests 350 from multiple client-side entities 340. Connection pool 310 includes physical connections 320 to server 330. For example, similar to the system described in FIG. 1, in an embodiment, physical connections 320 includes three connections, namely, first physical connection 322, second physical connection 324 and third physical connection 326.

If first communication request 352 is the first request for communication issued by client-side entities 340, then first communication request 352 may be serviced by any free physical connection 320 in connection pool 310. As such, first physical connection 322 may be used to service first communication request 352. Then, second physical connection 324 and third physical connection 326 are used, respectively, to service communication request 354 and communication request 356, which were issued, respectively, by client-side entity 344 and client side entity 346. Therefore, in this state, all physical connections 320 are being used by client-side entities 340. In such a state, a new physical connection is not created in response to second communication request 358 from client-side entity 342 was received by connection pool 310, since the establishment of such a physical connection 320 would wasteful. Rather, using the techniques described herein, it may not be necessary to establish a new physical connection. Specifically, when first physical connection 322 becomes free, first physical connection 322 may be reused to service second communication request 358 of client-side entity 342.

Similar to the embodiment illustrated in FIG. 1, and as discussed above, in some embodiments, connection pool 310 may include means to assign first physical connection 322 to client-side entity 342 and/or to first communication request 352, which was issued by client-side entity. In such embodiments, after first communication request 352 has been completed, first physical connection 322, which was assigned to client-side entity 342 and/or to first communication request 352, may be unassigned from client-side entity 342 and/or first communication request 352, and, as an unassigned, free member of connection pool 310, first physical connection 322 may be reassigned to client-side entity 342 and/or to a second communication request 358 issued by client-side entity 342, so as to service second communication request 358 and facilitate second communication request 358 between client-side entity 342 and server 330.

Additionally, connection pool 310 may include means to suspend the servicing of first communication request 352 to service second communication request 358. After second communication request 358 has been serviced, connection pool 310 can continue servicing first communication request 352.

Figure 4:
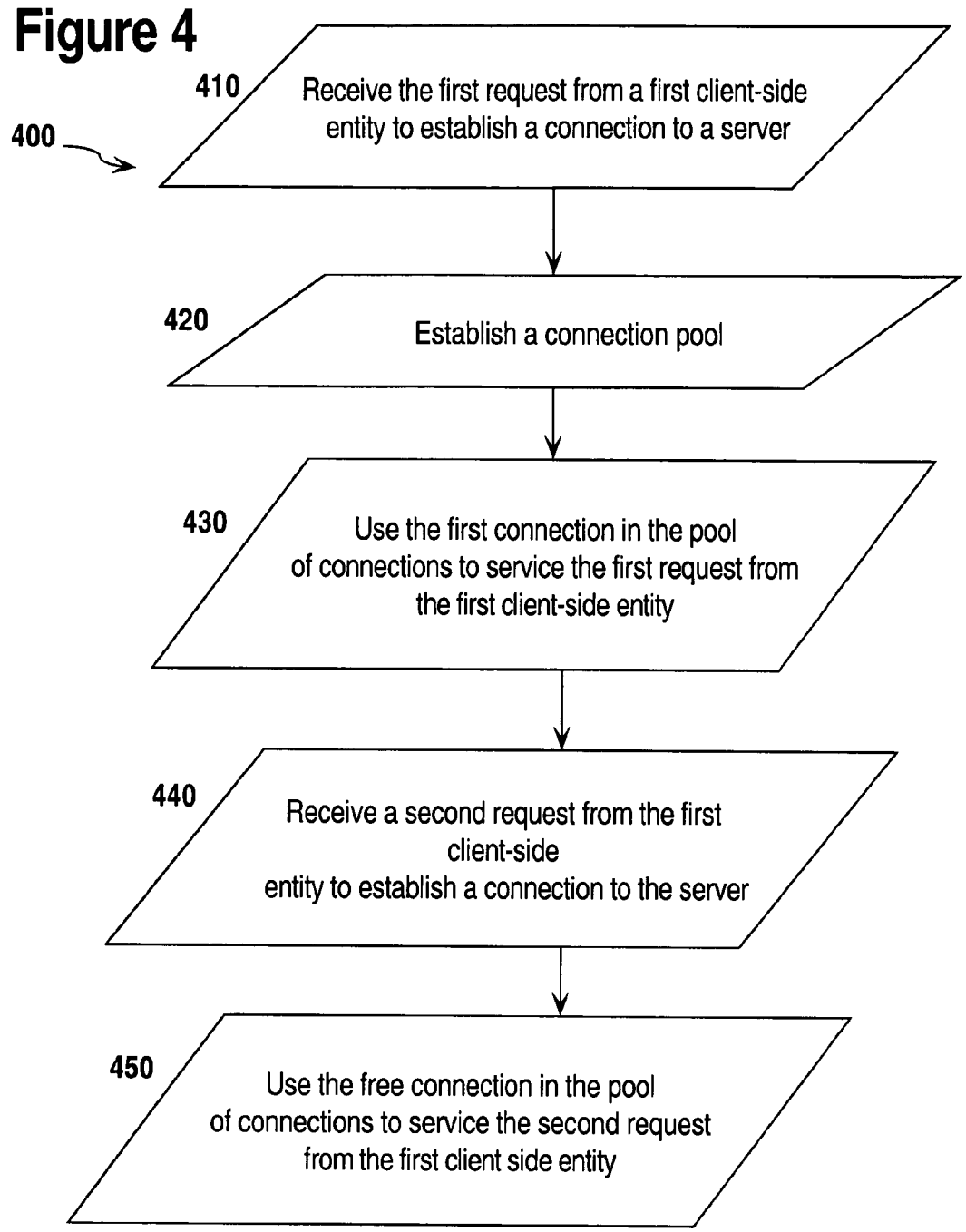
FIG. 4 is an illustration of a flowchart of an embodiment of a method of using a connection pool to service multiple requests from a single client-side entity.

FIG. 4 is an illustration of an embodiment of method 400 for communicating with server 330, by using connection pool 310 to service communication requests 350 from client-side entities 340. At step 410, first communication request 352 from client side entity 342, requesting to communicate with server 330, is received. Step 420 includes establishing a connection pool 310. Connection pool 310 includes at least one physical connection 320 to server 330. Connection pool 310 is capable of receiving and handling requests to communicate with server 330.

At step 430, first physical connection 322 is used to service first connection request 352. Step 440 includes receiving second communication request 358 from client-side entity 342 to communicate with server 330. Step 450 includes using first physical connection 322 to service second communication request 358. In some embodiments, one or more additional steps may be included in method 400. Examples of such steps include: (1) assigning first physical connection 322 to client-side entity 342 and/or to first communication request 352; (2) unassigning first physical connection 122 from client-side entity 342 and/or from first communication request 352; and/or (3) reassigning first physical connection 122 to client-side entity 342 and/or to second communication request 358; (4) determining whether one or more physical connections 320 meet specified criteria, such as being free; (5) determining whether one or more physical connections 320 and/or communication requests 350 are idle or have been serviced for a time exceeding a timeout parameter; and/or (6) directing a physical connection 320 to cease servicing a communication request 350.

Multiple Connection Pools

Figure 5:
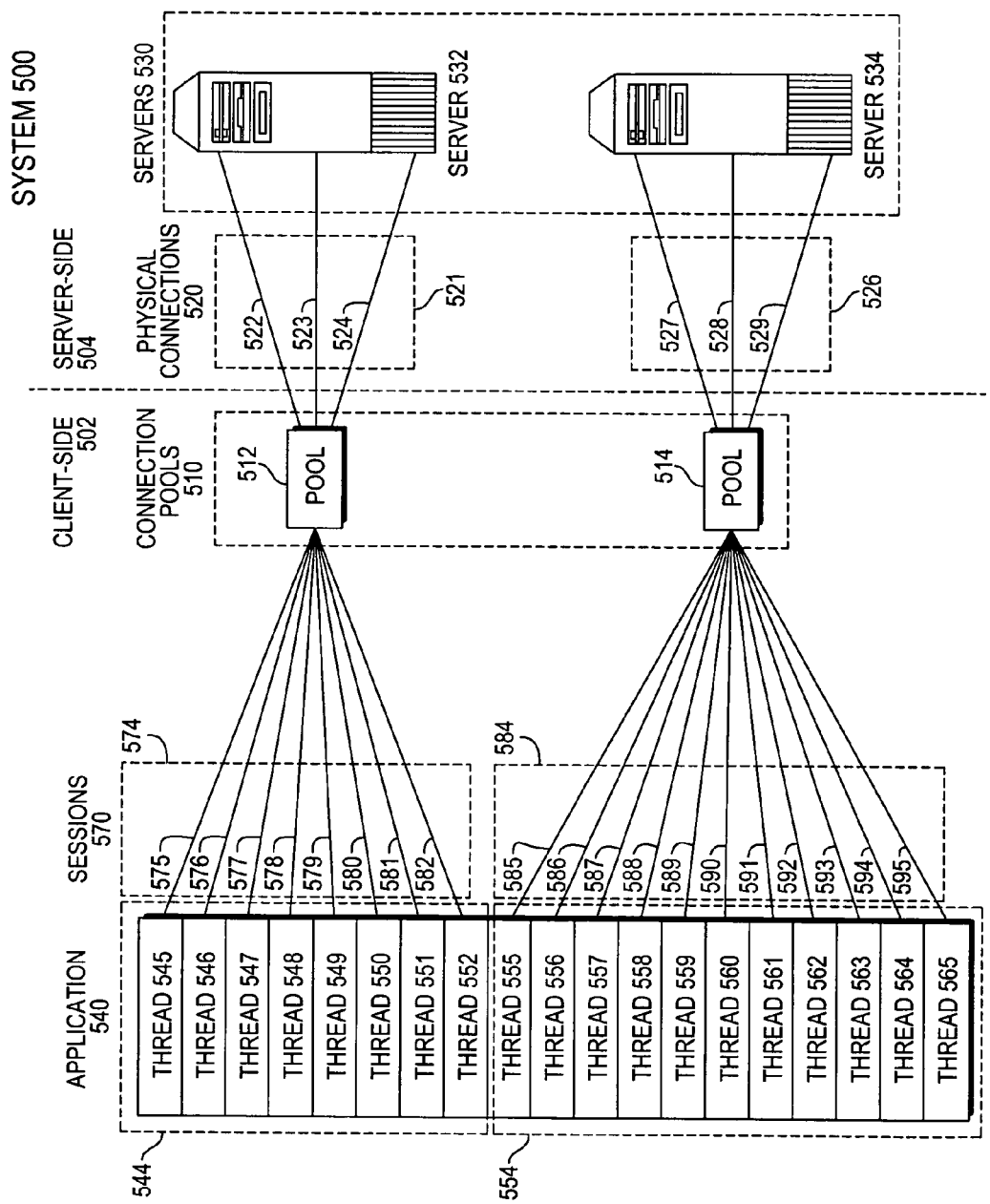
FIG. 5 is an illustration of a block diagram of an embodiment of a plurality of connection pools to service communication requests from a multi-threaded application.

FIG. 5 is an illustration of an embodiment of system 500, which includes at least one connection pool 510 to service sessions 570 of a multi-threaded application 540. In an embodiment, system 500 includes a plurality of connection pools 510, and each connection pool 510 is associated with a different server 530. Each connection pool 510 may include physical connections 520 to the server 530 that is associated with the respective connection pool 510. In other embodiments, more than one server 530 may be associated with a particular connection pool 510, and/or more than one connection pool 510 may be associated with a particular server 530. Each connection pool 510 may have different attributes, such as, for example, the maximum or minimum amount of connections, and timeout parameters.

More specifically, in the embodiment illustrated in FIG. 5, system 500 includes connection pool 512 and connection pool 514. Connection pool 512 is associated with server 532, and includes physical connections 521 to server 532. Physical connections 521 include first physical connection 522, second physical connection 523, and third physical connection

524. Connection pool 514 is associated with server 534, and includes physical connections 526 to server 534. Physical connections 526 include first physical connection 527, second physical connection 528 and third physical connection 529.

In the illustrated embodiment, application 540 includes a thread group 544 and a thread group 554. Thread group 544 includes threads 545 . . . 552. Thread group 554 includes threads 555 . . . 565 . . . 565. Thread group 544 is associated with connection pool 512. Therefore, connection pool 512 facilitates sessions 574 which are issued by threads in thread group 544. Sessions 574 includes sessions 575 . . . 582.

Thread group 554 is associated with connection pool 514. Thus, connection pool 514 facilitates sessions 584, which are issued by threads in thread group 554. Sessions 584 includes sessions 585 . . . 595.

At least one of connection pools 510 may function according to the embodiments described above in FIG. 1 and FIG. 3, so as to facilitate communication between the threads in a thread group 544 and the associated server 530. In this embodiment, multiple threads, such as those in thread group 544, or multiple sessions 570 that are associated with a particular connection pool 510, may reuse a single physical connection 520 in the associated connection pool 510 so as to communicate with the associated server 530. Additionally, a single physical connection 520 in a connection pool 510 may be reused to service multiple sessions 570 of the same thread 570.

Implementation of Client-Side Connection Pools

Figure 6:
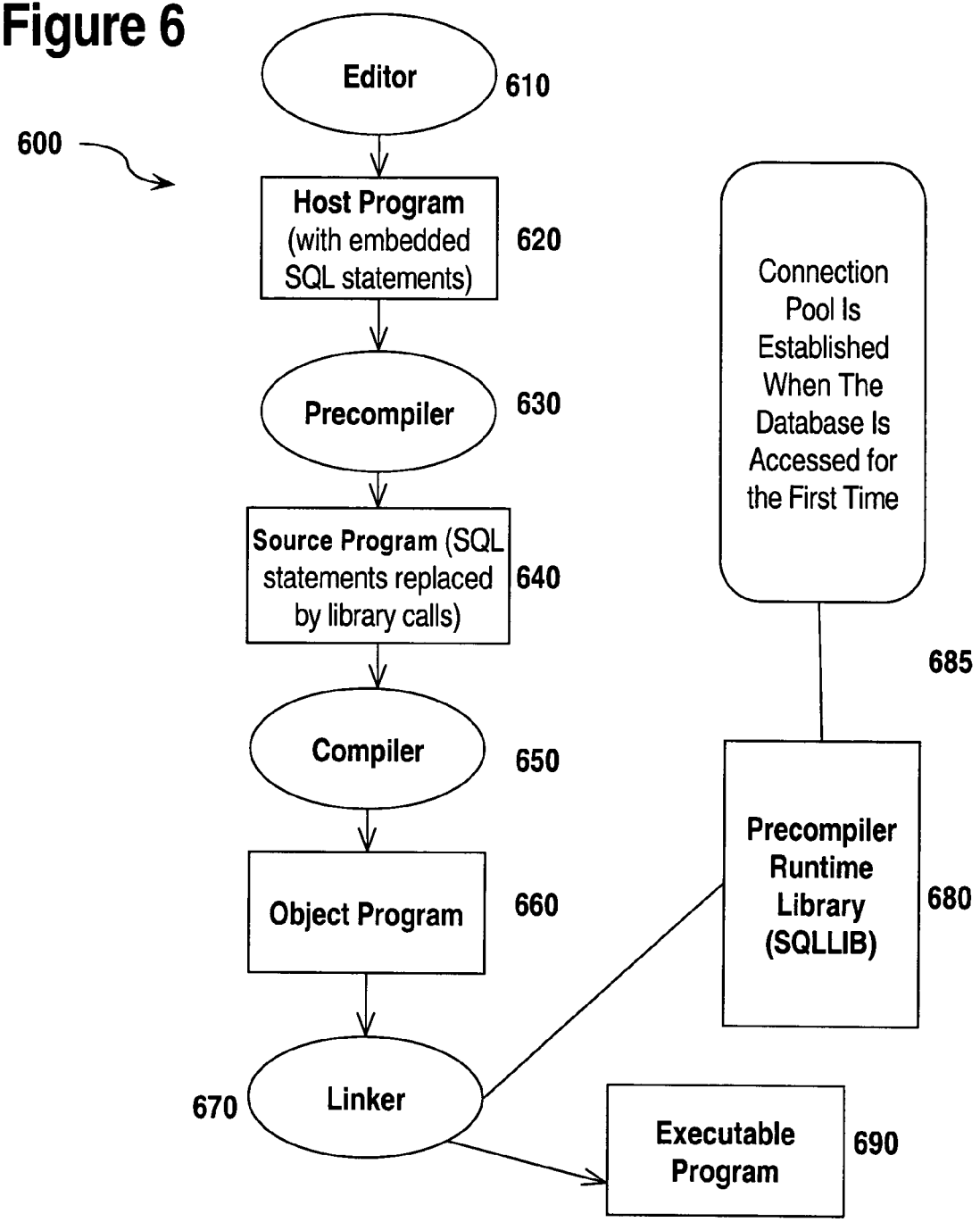
FIG. 6 is an illustration of a block diagram of an embodiment of a system comprising a precompiler and other elements to facilitate the establishment of connection pools.

FIG. 6 is an illustration of an embodiment of a system 600, which includes a precompiler 630 and a library 680. Precompiler 630 and library 680 may be used to facilitate the establishment of connection pools 685. More specifically, in an embodiment, the code for the client-side entity includes an embedded program statement that requires communication with a server. In the context of a database application, the embedded program statement may be, for example, an embedded SQL command that the database application is designed to submit to a database server.

Precompiler 630 parses the code for the client-side entity, and detects the embedded program statement. Precompiler 630 then converts the embedded program statement to one or more calls to one or more routines within library 680. In response to the calls to library 680, at least one connection pool 685 will be established.

In an embodiment, precompiler 630 may be any mechanism for converting from first code to a second code. Those skilled in the art will recognize that the subject matter disclosed in this application may be used with regard to various types of precompilers, and, such other embodiments also fall within the scope of the disclosed subject matter. In the context of a database system, library 680 may be, for example, a structured query language library (SQLLIB).

In an embodiment, precompiler 630 is configured to process a first set of code 820 for an application (not shown), such as, for example, a multi-threaded application, to generate a second set of code 640 for the multi-threaded application. For the purpose of explanation, the first set of code 620 may be referred to hereafter the "host program" for the application, and the second set of code 640 may be referred to as the "source program" for the application.

Precompiler 630 may process host program 620 so as to convert an embedded program statement in host program 620 to one or more calls to routines in library 680. As mentioned above, in the context of a database application, the embedded program statement that is converted by precompiler 630 may be a structured query language statement (SQL statement). In other contexts, the embedded program statement in host program 620 may be another type of embedded command that necessitates communication with a server. The techniques described herein are not limited to any particular client-server context.

In an embodiment, system 600 may also include compiler 650. Compiler 650 may be configured to process source program 640 to generate a third set of code 660. The third set of code 660 may be, for example, object code, machine-executable code, or code that is executable by a virtual machine.

In an embodiment, system 600 may also include linker 670. Linker 670 is configured to link the third set of code 660 with the code contained in library 680 to form a fourth set of code 690. Depending on the programming environment, linker 670, compiler 650, and/or precompiler 630 may all be part of the same tool, rather than independent stand-alone tools.

According to one embodiment, when the fourth set of code 690 is executed, the resulting process, which is an instance of the application, will create a pool of server handles. In response to one or more call from the application, routines in library 680 maintain and manage a list of connection pool handles. To do this, the routines in library 680 will establish at least one connection pool 685 the first time that the application requests communication with the server. On at least one subsequent request for communication to the server, the called routine within library 680 will establish an association between a connection pool handle and a server handle, so that the application may use any free physical connections in connection pool 685. The routines in library 680 may handle mapping between connection pool handles and the physical connections.

Precompiler 630 will get user options for a connection pool and will pass the values to the runtime library 680, SQLLIB. SQLLIB creates the connection pool list when the first connection pool is created. When a second communication request comes in, SQLLIB will check for the existence (see subprocess 920 in FIG. 9, described below) of a connection pool to the requested database in the connection pool list. If a connection pool to the requested database exists, then SQLLIB creates an association between the communication request and the pool, otherwise SQLLIB will create a new connection pool and add the new connection pool to the connection pool list (see subprocess 930 of FIG. 9, described below). After the application closes all communication requests, SQLLIB destroys the connection pool list (see subprocess 940 of FIG. 9, described below). With this approach, an application will be able to share/reuse the pool of connections to the database for different threads created by the application. This improves the performance, and reduces the use of resources by avoiding the use of dedicated connections.

Figure 7:
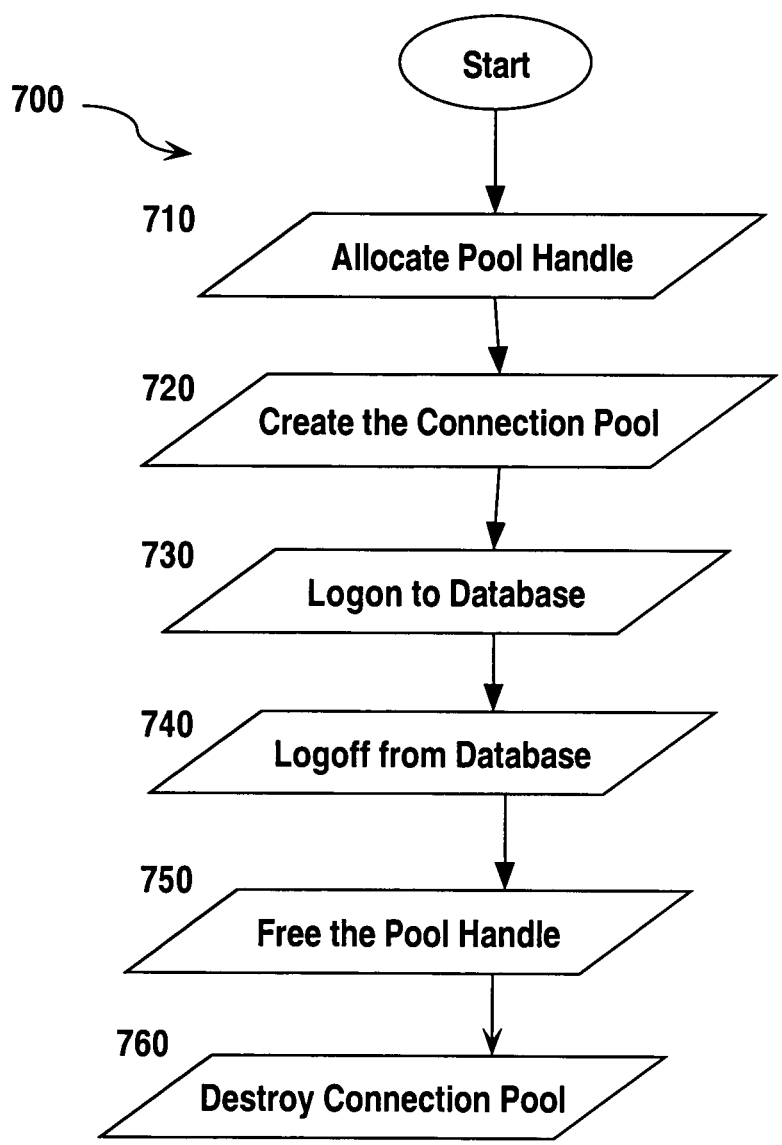
FIG. 7 is an illustration of a flowchart of an embodiment of a method for establishing a connection pool.

FIG. 7 is an illustration of an embodiment of method 700 for establishing a connection pool 710. In an embodiment, method 700 includes, at step 710, allocating a pool handle. Step 720 includes creating connection pool 110. Step 720 may include various substeps, such as steps for setting parameters for connection pool 110. A number of representative parameters that may be set in these substeps are illustrated below in FIG. 8. The parameters, which control the attributes of connection pool 110, are set during precompilation time. Any number of pools may be created by an application. At step 730, a user logs on to a database. In an embodiment, each thread may use a user name and a password to log on to the server. A set of service context handles may be attached to the connection pool, for use by threads to process database cells. A proxy user may also logon. At step 740, the user logs off the database. Step 750 includes freeing the pool handle that was allocated in step 710. At step 760, in an embodiment, connection pool 110 may be destroyed.

Figure 8:
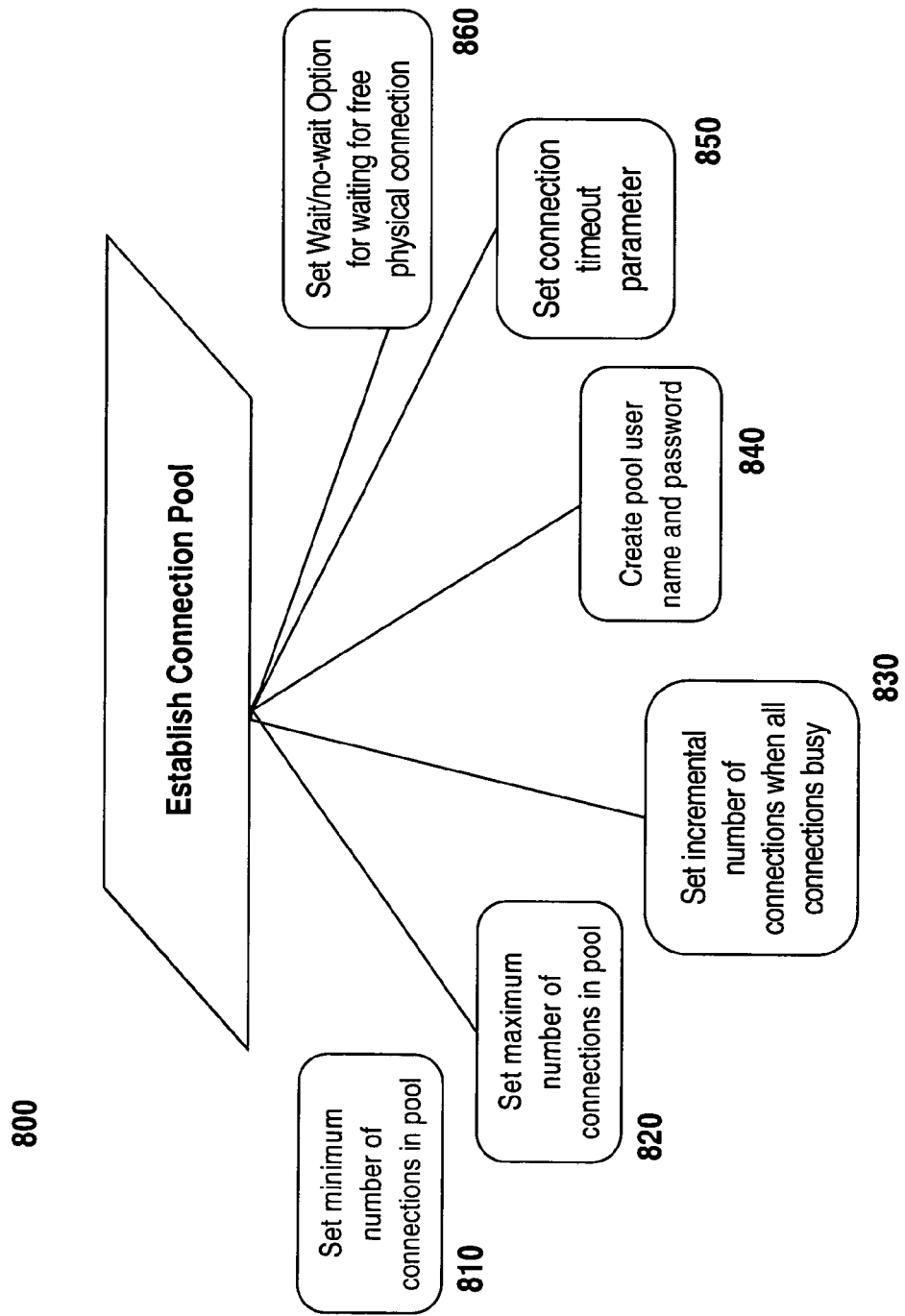
FIG. 8 is an illustration summarizing a number of connection pool attributes that may be established in an embodiment of the creation of a connection pool.

FIG. 8 is an illustration summarizing a number of connection pool attributes that may be established in an embodiment of method 800 for connection pool establishment. In an embodiment, at step 810, a minimum number x of physical connections that make up the pool is set. When the connection pool is established, it will include x physical connections.

Step 820 includes establishing a maximum number of physical connections that may to be included in the connection pool. If a new communication request is received by the connection pool when the maximum connections are being used, then the new communication request will not be serviced until a physical connection in the connection pool is free, or, until a criteria, such as a timeout parameter, is met by the physical connection and/or the communication request being serviced by the physical connection.

At step 830, an incremental number y is set. In an embodiment, when all the physical connections in the connection pool are being used, y physical connections will be added to the connection pool. The minimum number of connections can be incremented until the maximum number of connections is reached. Step 840 includes creating a pool user name and password.

Step 850 includes setting a connection timeout parameter. If a physical connection that has been assigned to a client-side entity remains idle for a period of time equal to or greater than the time out parameter, then the physical connection will be unassigned from the client-side entity, and, the physical connection may be assigned to another communication request. In an embodiment, a physical connection may be removed from the connection pool if the timeout parameter is satisfied.

Figure 9:
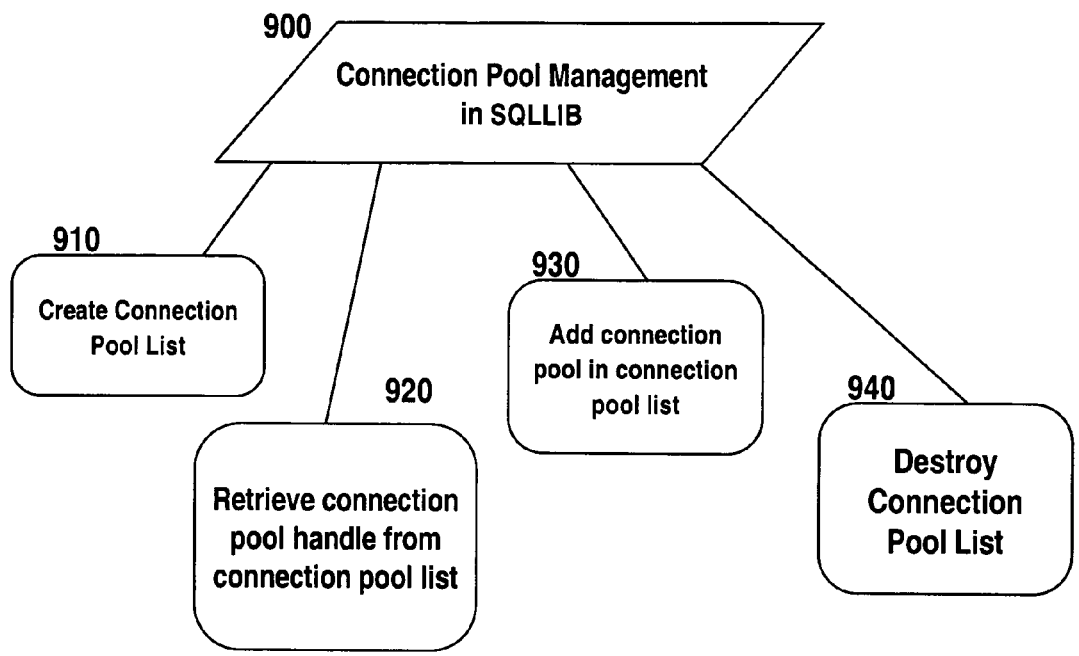
FIG. 9 is an illustration summarizing a number of processes that may be utilized to manage a connection pool in an embodiment.

FIG. 9 is an illustration summarizing a number of subprocesses that may be utilized in the process of connection pool management in an embodiment. In subprocess 910, precompiler runtime library SQLLIB creates the connection pool list when the first connection pool 110 is created. In subprocess 920, when second communication request comes in, SQLLIB will check for the existence of the connection pool 110 to the requested database in the connection pool list. In subprocess 930, if a connection pool 110 exists in respect of the requested database server 130, then SQLLIB creates the association between the communication request and the connection pool 110; otherwise SQLLIB creates a new connection pool 110 and adds the new connection pool 110 to the connection pool list. In subprocess 940, after the application closes all communication requests, SQLLIB destroys the connection pool list.

Hardware Overview

The approach for establishing and using connection pools described herein may be implemented in a variety of ways and the invention is not limited to any particular implementation. The approach may be integrated into a computer system or a network device, or may be implemented as a stand-alone mechanism. Furthermore, the approach may be implemented in computer software, hardware, or a combination thereof.

Figure 10:
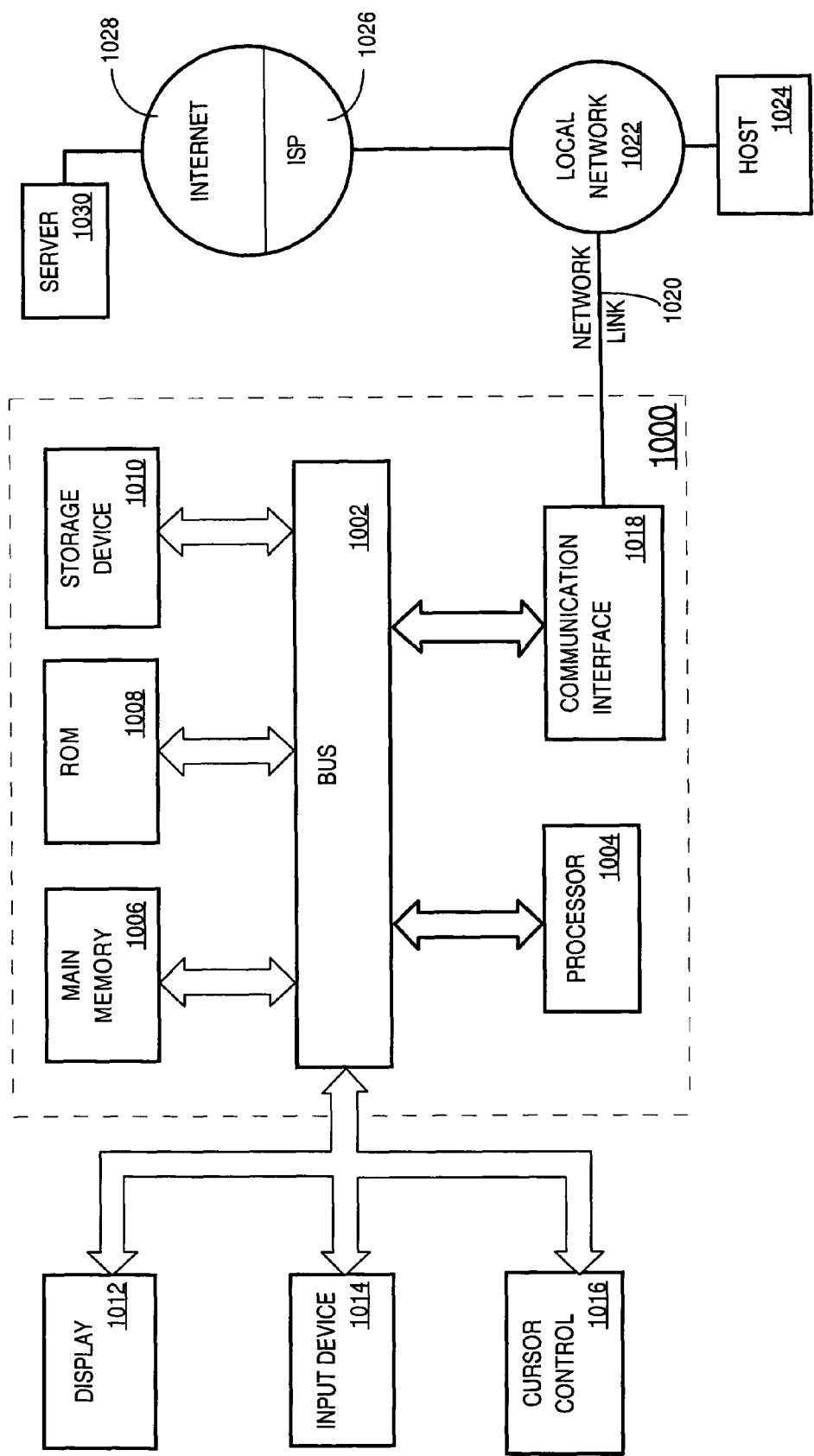
FIG. 10 is a block diagram of a computer system on which embodiments of the invention may be implemented.

FIG. 10 is a block diagram that depicts a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method of communicating between an application executing on a computer system and a server, comprising:
on a client side, a client-side application establishing a connection pool to the server,
wherein the connection pool includes a set of physical connections from the connection pool to the server,
wherein the server is a database server, and
wherein the client-side application is a database application; and
in response to a request issued by a client-side entity to communicate with the server, the client-side application using one physical connection in the connection pool to service said request, wherein the connection was established with said server prior to said request.

2. The method of claim 1, further comprising the steps of:
using a precompiler to process a program, wherein
the program contains an embedded statement, and
the precompiler converts the embedded program statement to a call in a runtime library,
wherein the step of establishing a pool is performed in response to said call to said runtime library.

3. The method of claim 1,
wherein said request is a first request and said physical connection is a first connection, and,
wherein said connection pool is established in response to a second request that is received prior to the first request and a second connection in the connection pool is used to service said second request, the method further comprising:
reusing said second connection to service a third request to communicate with the server.

4. The method of claim 1, further comprising:
determining whether there are unassigned connections in the connection pool; and
if there are no unassigned connections in the connection pool, adding at least one connection to the connection pool.

5. The method of claim 1, further comprising:
determining whether there are more connections in the connection pool than are needed; and
if there are more connections than are needed, removing at least one connection from the connection pool.

6. The method of claim 1, further comprising:
determining whether the connection in the connection pool that is assigned to the client-side entity has been idle for a duration of time equal to or greater than a time out parameter; and
if said connection in the connection pool that is assigned to the client-side entity has been idle for a duration of time equal to or greater than a time out parameter, unassigning from the client-side entity said connection.

7. The method of claim 6, further comprising the step of:
if said connection in the connection pool that is assigned to the client-side entity has not been idle for a duration of time equal to or greater than a time out parameter, not unassigning said connection from the client-side entity.

8. The method of claim 6, further comprising removing said connection from the connection pool.

9. The method of claim 1, further comprising:
determining whether the quantity of connections in the connection pool is less than a maximum quantity of connections; and
if the quantity of connections is less than the maximum quantity of connections, adding a connection to the connection pool.

10. The method of claim 1, wherein establishing the connection pool comprises:
determining whether the quantity of connections in the connection pool is greater than a minimum amount of connections; and
if the quantity of connections is greater than the minimum amount of connections, removing a connection from the connection pool.

11. The method of claim 4, further comprising incrementing, by a value of one or more, the maximum quantity of connections in the connection pool.

12. The method of claim 1, wherein establishing the connection pool comprises:
setting a time out parameter, the time out parameter to be used to determine whether the connection is to be unassigned from the client-side entity after the connection is idle for a duration of time equal to or greater than the time out parameter.

13. The method of claim 1, further comprising establishing at least one additional connection pool so as to form a plurality of connection pools.

14. The method of claim 13, further comprising:
associating a first group of client-side entities with a first connection pool in the plurality of connection pools; and
associating a second group of client-side entities with a second connection pool in the plurality of connection pools.

15. A system comprising:
one or more processors;
a storage device;
a library of software routines, wherein the library is stored on the storage device,
a mechanism to convert a first set of code to a second set of code, wherein the second set of code is code for a client-side application,
wherein said mechanism is configured to convert an embedded program statement in the first set of code to a call by said client-side application to a routine in the library, said embedded program statement specifying an operation that involves communication with a server,
wherein the routine contains logic for establishing a connection pool on a client-side in response to said call by said client-side application,
wherein the connection pool includes a set of physical connections from the connection pool to the server,
wherein the server is a database server, and
wherein the client-side application is a database application.

16. The system of claim 15 wherein the mechanism is a precompiler.

17. The system of claim 15, wherein the library is a runtime library.

18. A storage device having stored thereon one or more sequences of instructions which, when executed by one or more processors, causes the one or more processors to perform:
communicating between an application executing on a computer system and a server at least in part by performing:
on a client side, a client-side application establishing a connection pool to the server, wherein the connection pool includes a set of physical connections from the connection pool to the server,
wherein the server is a database server, and
wherein the client-side application is a database application; and
in response to a request issued by a client-side entity to communicate with the server, the client-side application using one physical connection in the connection pool to service said request, wherein the connection was established with said server prior to said request.

19. The storage device of claim 18, wherein the one or more sequences of instructions, when executed by one or more processors, further cause:
using a precompiler to process a program, wherein
the program contains an embedded statement, and
the precompiler converts the embedded program statement to a call in a runtime library,
wherein the one or more sequences of instructions, when executed by one or more processors, cause the step of establishing a pool in response to said call to said runtime library.

20. The storage device of claim 18, wherein said request is a first request and said physical connection is a first connection, and wherein said connection pool is established in response to a second request that is received prior to the first request and a second connection in the connection pool is used to service said second request, and wherein the one or more sequences of instructions, when executed by one or more processors, further cause:
reusing said second connection to service a third request to communicate with the server.

21. The storage device of claim 18, wherein the one or more sequences of instructions, when executed by one or more processors, further cause:
determining whether there are unassigned connections in the connection pool; and
if there are not unassigned connections in the connection pool, adding at least one connection to the connection pool.

22. The storage device of claim 18, wherein the one or more sequences of instructions, when executed by one or more processors, further cause:
determining whether there are more connections in the connection pool than are needed; and
if there are more connections than are needed, removing at least one connection from the connection pool.

23. The storage device of claim 18, wherein the one or more sequences of instructions, when executed by one or more processors, further cause:
determining whether the connection in the connection pool that is assigned to the client-side entity has been idle for a duration of time equal to or greater than a time out parameter; and
if said connection in the connection pool that is assigned to the client-side entity has been idle for a duration of time equal to or greater than a time out parameter, unassigning from the client-side entity said connection.

24. The storage device of claim 23, wherein the one or more sequences of instructions, when executed by one or more processors, further cause:
if said connection in the connection pool that is assigned to the client-side entity has not been idle for a duration of time equal to or greater than a time out parameter, not unassigning said connection from the client-side entity.

25. The storage device of claim 23, wherein the one or more sequences of instructions, when executed by one or more processors, further cause:
removing said connection from the connection pool.

26. The storage device of claim 18, wherein the one or more sequences of instructions, when executed by one or more processors, further cause:
determining whether the quantity of connections in the connection pool is less than a maximum quantity of connections; and
if the quantity of connections is less than the maximum quantity of connections, adding a connection to the connection pool.

27. The storage device of claim 18, wherein establishing the connection pool comprises:
determining whether the quantity of connections in the connection pool is greater than a minimum amount of connections; and
if the quantity of connections is greater than the minimum amount of connections, removing a connection from the connection pool.

28. The storage device of claim 21, wherein the one or more sequences of instructions, when executed by one or more processors, further cause:
   incrementing, by a value of one or more, the maximum quantity of connections in the connection pool.

29. The storage device of claim 18, wherein establishing the connection pool comprises:
   setting a time out parameter, the time out parameter to be used to determine whether the connection is to be unassigned from the client-side entity after the connection is idle for a duration of time equal to or greater than the time out parameter.

30. The storage device of claim 18, wherein the one or more sequences of instructions, when executed by one or more processors, further cause:
   establishing at least one additional connection pool so as to form a plurality of connection pools.

31. The storage device of claim 30, wherein the one or more sequences of instructions, when executed by one or more processors, further cause:
   associating a first group of client-side entities with a first connection pool in the plurality of connection pools; and
   associating a second group of client-side entities with a second connection pool in the plurality of connection pools.

32. The method of claim 1, wherein said request is a first request, and the method further comprises reusing said physical connection to service a second request to communicate with the server.

33. The method of claim 32, wherein:
   the first request is issued by a first client-side entity; and
   the second request is issued by a second client-side entity different from the first client side entity.

34. The method of claim 32, wherein the first request and the second request are issued by the same client-side entity.

35. The method of claim 34, wherein the first client-side entity is a first thread in a multi-threaded application and the second-client side entity is second thread different from the first thread in said multi-threaded application.

36. The method of claim 35, wherein the client-side entity is a thread in a multi-threaded application.

37. The method of claim 1, wherein the client-side entity is a thread in a multi-threaded application.

38. The method of claim 1, wherein the application is a multi-threaded application, and a second thread of the multi-threaded application reuses one physical connection in the connection pool that was used by a first thread of the multi-threaded application.

39. The storage device of claim 18, wherein said request is a first request, and wherein the one or more sequences of instructions, when executed by one or more processors, further cause:
   reusing said physical connection to service a second request to communicate with the server.

40. The storage device of claim 39, wherein:
   the first request is issued by a first client-side entity; and
   the second request is issued by a second client-side entity different from the first client side entity.

41. The storage device of claim 39, wherein the first request and the second request are issued by the same client-side entity.

42. The storage device of claim 41, wherein the one or more sequences of instructions, when executed by one or more processors, further cause.

43. The storage device of claim 42, wherein the client-side entity is a thread in a multi-threaded application.

44. The storage device of claim 18, wherein the client-side entity is a thread in a multi-threaded application.

45. The storage device of claim 18, wherein the application is a multi-threaded application, and a second thread of the multi-threaded application reuses one physical connection in the connection pool that was used by a first thread of the multi-threaded application.

* * * * *

UNITED STATES PATENT AND TRADEMARK OFFICE
CERTIFICATE OF CORRECTION

| | | |
|---|---|---|
| PATENT NO. | : 8,621,031 B2 | Page 1 of 1 |
| APPLICATION NO. | : 10/426824 | |
| DATED | : December 31, 2013 | |
| INVENTOR(S) | : Desai | |

It is certified that error appears in the above-identified patent and that said Letters Patent is hereby corrected as shown below:

In the Specification

In column 9, line 43, delete "Precompilier" and insert -- Precompiler --, therefor.

In the Claims

In column 18, Claim 42, lines 25-27, after "The storage device of claim 41", delete "wherein the one or more sequences of instructions, when executed by one or more processors, further cause." and insert -- wherein the first client-side entity is a first thread in a multi-threaded application and the second-client side entity is second thread different from the first thread in said multi-threaded application. --, therefor.

Signed and Sealed this
Fourteenth Day of July, 2015

Michelle K. Lee
*Director of the United States Patent and Trademark Office*